(12) United States Patent
Brosowske et al.

(10) Patent No.: US 7,658,124 B2
(45) Date of Patent: Feb. 9, 2010

(54) COMPLIANT GEAR ASSEMBLY AND WORK MACHINE USING SAME

(75) Inventors: Thomas A. Brosowske, Peoria, IL (US);
Aaron J. Weber, Fort Wayne, IN (US);
Scott A. Snoble, Pekin, IL (US);
Thomas L. Atwell, Peoria, IL (US);
Joseph R. Derk, Morton, IL (US);
Cristian V. Striletchi, Dunlap, IL (US);
Dwight V. Stone, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 342 days.

(21) Appl. No.: 11/493,982

(22) Filed: Jul. 27, 2006

(65) Prior Publication Data
US 2008/0041177 A1    Feb. 21, 2008

(51) Int. Cl.
*F16H 55/18*    (2006.01)
(52) U.S. Cl. ............................. 74/440; 74/409; 74/411
(58) Field of Classification Search .................. 74/392, 74/395–397, 409, 411, 440
See application file for complete search history.

(56) References Cited

U.S. PATENT DOCUMENTS

| | | | |
|---|---|---|---|
| 2,307,129 A | 1/1943 | Hines et al. | |
| 2,918,826 A | * 12/1959 | Miller | 74/411 |
| 4,072,064 A | * 2/1978 | Lloyd et al. | 74/409 |
| 4,674,351 A | 6/1987 | Byrd | |
| 4,831,897 A | 5/1989 | Dobbs | |
| 5,170,676 A | 12/1992 | Matouka et al. | |
| 5,452,622 A | 9/1995 | Fenelon | |
| 5,540,112 A | 7/1996 | Baker et al. | |
| 5,685,197 A | 11/1997 | Baker et al. | |
| 5,870,928 A | 2/1999 | Genter et al. | |
| 5,979,259 A | 11/1999 | Shook et al. | |
| 5,979,260 A | 11/1999 | Long et al. | |
| 6,021,686 A | 2/2000 | Mizoguchi | |
| 6,247,377 B1 | 6/2001 | Long et al. | |
| 6,782,773 B1 | 8/2004 | Jacquemont et al. | |

FOREIGN PATENT DOCUMENTS

| | | |
|---|---|---|
| DE | 1 450 895 | 10/1971 |
| JP | 59-85405 | 5/1984 |
| KR | 10-2004-0026350 | 3/2004 |
| NL | 6 707 093 | 11/1967 |

OTHER PUBLICATIONS

PCT International Search Report; Applicant's Ref. No. 05-818; PCT/US2007/012633; Filing Date: May 25, 2007; Applicant: Caterpillar Inc.

* cited by examiner

*Primary Examiner*—Richard W L Ridley
*Assistant Examiner*—Phillip Johnson
(74) *Attorney, Agent, or Firm*—Liell & McNeil

(57) ABSTRACT

A compliant gear assembly includes a gear ring positioned about a hub and configured to translate responsive to a torque on the gear assembly, and biased toward co-axial alignment with the hub via at least one actuator. A method of managing loads on an idler gear in the gear train is still further provided including translating the gear ring responsive to the torque on the idler gear. A work machine includes an engine having a housing and a geartrain mounted thereon, the geartrain including a crank gear, a cam gear and a compliant idler gear assembly.

7 Claims, 8 Drawing Sheets

COMPLIANT GEAR ASSEMBLY AND WORK MACHINE USING SAME

TECHNICAL FIELD

The present disclosure relates generally to compliant gear assemblies, and relates more particularly to a compliant gear assembly, such as for use in an engine geartrain, having a hub and a gear ring translatable from coaxial alignment responsive to a torque on the gear assembly.

BACKGROUND

Excessive noise resulting from impacting and chattering, clattering gear teeth has been associated with gear systems for many years. In general terms, "gear rattle" refers to the noise phenomenon wherein gear teeth of adjacent gears come out of mesh and are rapidly forced back into mesh by a backside tooth impact, generating an audible noise. Not only can loud sounds from gear rattle make a work environment uncomfortable, the impacts between gear teeth and shocks through gear systems can result in premature wear and undue stress on components of the system. Moreover, where a given gear rattles against a meshing gear partner rather than smoothly transmitting torque, energy can be wasted in a manner familiar to those skilled in the gear-related arts.

In the context of an internal combustion engine, it is common to utilize a series of gears or a "geartrain" to power certain engine components, and to provide for a desired relative timing between certain of the gears. In one example, a crank gear, rotated by the engine crankshaft, is rotatably linked with a cam gear, in turn coupled with one or more cams of the engine. One or more gears may be operably disposed between the crank and cam gears to maintain a relative timing between the two such that certain cam-actuated engine functions such as valve opening/closing and fuel injection will reliably take place at a desired time relative to engine crank angle.

On certain engines, dynamic activity of the crank and cam gears can be substantial, imparting significant torques through the geartrain during operation. It is thus common for each of the crank and cam gears to experience impulsive accelerations and decelerations during engine operation. Cylinder firing applies a torque to the crankshaft and hence crank gear, whereas fuel injection tends to apply a torque to the camshaft and, hence, cam gear. In some engine systems, the rotational speed of the cam shaft may temporarily slow down hundreds of revolutions per minute from its average rotational speed due to force of mechanically actuated fuel injections. Torque impulses from the camshaft and crankshaft may affect the geartrain independently from one another, or they may be additive or subtractive. Cylinder firing, fuel injection and other events tend to take place in relatively rapid succession, thus it will be readily apparent to those skilled in the art that the dynamic behavior of the geartrain under such conditions may be quite complex. Energy transfer through a relatively stiff geartrain with significant component inertias and backlash, or the separation of adjacent gear teeth, may be a series of very dynamic events with significant peak torque magnification, especially when large inertias from different gears collide with different velocities. In some instances, for example where a timing gear between the crank and cam gears, known in the art as an "idler gear," experiences torque impulses from either or both of the cam and crank gears, it may be induced to clatter intensely back and forth before settling back to relatively smooth operation. The front geartrain may be the most significant noise producing part of an engine system.

The above problems have tended to be particularly acute in heavy duty compression ignition engines, as they tend to experience gear rattle problems over a greater range of operating conditions than lighter duty and/or spark ignited engines. Moreover, the desire to reduce certain gaseous emissions in compression ignition engines has been addressed with higher peak cylinder pressures and higher injection pressures, resulting in even greater impulsive loading in the engine geartrain.

In addition to the obvious benefits of reducing wear and stress on the machine, and ameliorating the waste of energy, certain jurisdictions have paid increasing attention to geartrain noise levels in working machinery. A host of reasons thus exist for addressing excessive noise production in gear systems. As stated above, problems associated with excessive gear noise have been recognized for many years. Engineers have thus sought to address such noise problems by a variety of means, one of which has been to increase the mass moment of inertia of the geartrain and associated components to reduce its susceptibility to torque related disturbances. This has been achieved, for example, by increasing the mass of the gears themselves, and/or by incorporating pendulums to the cam and crank shafts. Adding mass to the engine and/or geartrain components has obvious drawbacks, including increasing the overall weight, size and cost of the system. Another approach has been to introduce compliance into the geartrain.

In general terms, compliant gears provide reduced stiffness, or slack, in the geartrain, allowing one or more of the gears to attenuate its response to impulsive loads. Where a particular gear might otherwise be sharply accelerated or decelerated due to a torque impulse, compliance will allow the gear to more gradually adjust its rotation to accommodate the impulsive load. Compliant gears can thus allow adjacent gears to stay in mesh more of the time than non-compliant systems, reducing undue wear, mechanical strain and audible noise.

In one compliant gear design, "scissors gears" consisting of two closely adjacent coaxial gears having some rotational compliance are used to transmit torque or maintain timing between or among other gears. In a typical design, a front gear member of a scissors gear set meshes with a first gear, and a back gear member of the scissors gear set meshes with a second gear. Gear teeth of the respective front and back gear members of the scissors gears are movable relative to one another such that pairs of adjacent gear teeth behave in manner considered similar to the operation of a pair of scissors, hence the name. While such a design, introducing rotational compliance between the front and back gears, may have certain benefits, the systems tend to be quite expensive and complex.

Another gear design using rotational compliance is known from U.S. Pat. No. 5,170,676 to Matouka et al. (hereafter "Matouka"). Matouka illustrates a torque limiter for use in a geartrain which allows relative motion, i.e. rotational compliance, between a hub and gear ring when a certain torque value on the gear is exceeded. Matouka utilizes a spring whose spring force must be overcome before the gear ring and hub are able to rotationally slip from one relative position to another. While Matouka is applicable in some systems the design is not without drawbacks.

The present disclosure is directed to one or more of the problems or shortcomings set forth above.

SUMMARY OF THE DISCLOSURE

In one aspect, the present disclosure provides a gear assembly that includes a hub defining a first axis, and a gear ring positioned about the hub. The gear ring defines a second axis, and is configured to translate in a direction perpendicular to the first axis responsive to a torque on the gear assembly. At least one actuator is coupled between the hub and the gear ring and is configured to bias the gear ring toward coaxial alignment with the hub.

In another aspect, the present disclosure provides a work machine including an engine having a housing and a geartrain mounted thereon. The geartrain includes a crank gear, a cam gear and a compliant idler gear assembly having a hub rotatably mounted to the housing and defining an axis. The idler gear assembly further includes a gear ring configured to mesh with the crank gear and the cam gear which is translatable relative to the axis responsive to a torque on the idler gear from at least one of the crank gear and the cam gear.

In still another aspect, the present disclosure provides a method of managing loads on an idler gear in a geartrain of an engine system. The method includes the steps of applying a torque to a first gear via at least one other gear, the first gear being an idler gear, and biasing a gear ring and a hub of the idler gear toward a co-axial relationship via at least one actuator disposed therebetween. The method further includes the step of translating the gear ring against the bias in a direction perpendicular to the axis responsive to the torque on the idler gear.

BRIEF DESCRIPTION OF THE DRAWINGS

FIG. 3b is a back perspective view of the compliant idler gear assembly of FIG. 3a;

FIG. 6 is a sectioned view of a portion of a compliant idler gear assembly, taking along line 6-6 of FIG. 3a;

DETAILED DESCRIPTION

Figure 1:
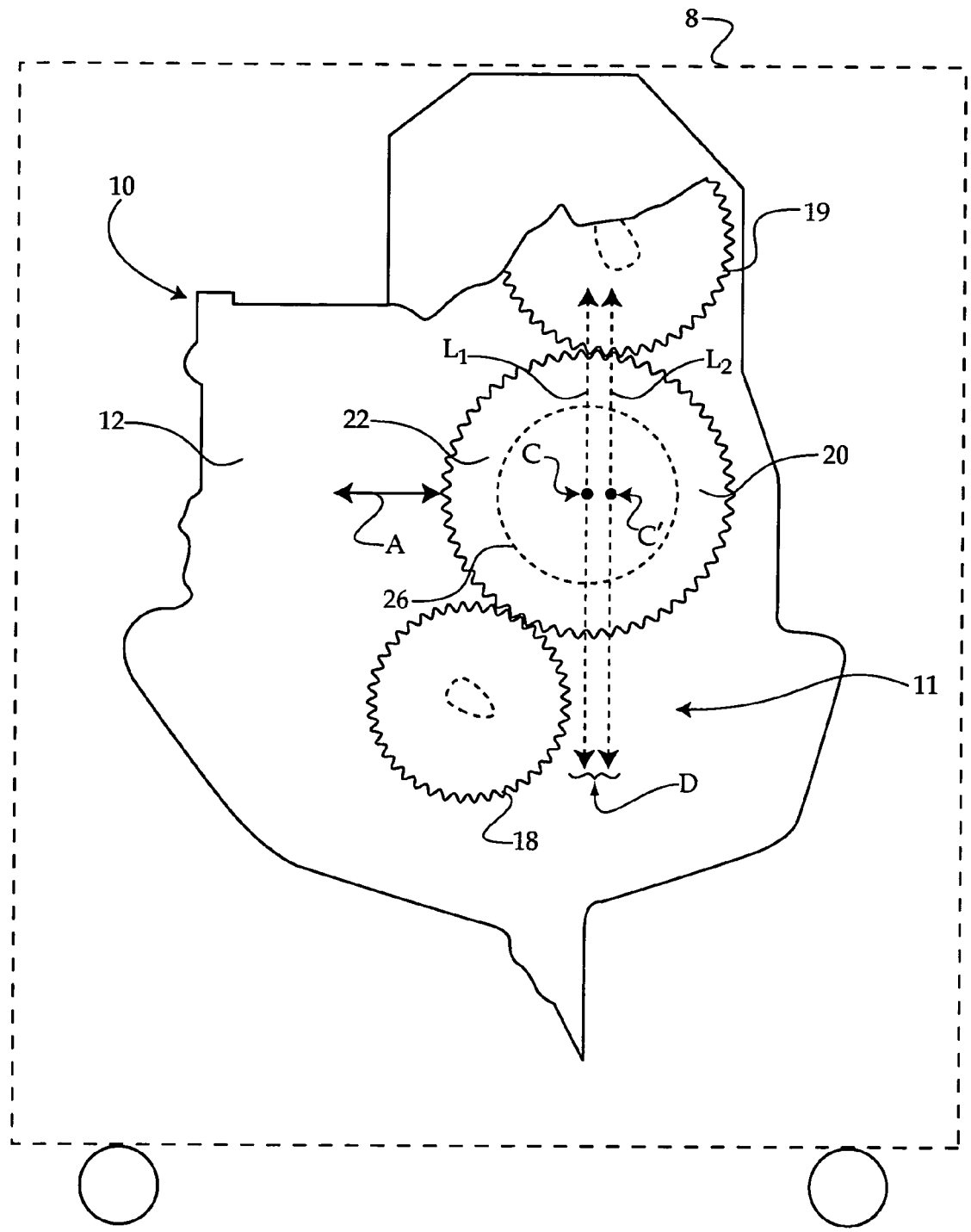
FIG. 1 is a schematic illustration of a work machine with an engine system according to the present disclosure.

Referring to FIG. 1, there is shown an engine system 10 in a work machine 8, the engine system including an engine 12, for example an in-line compression ignition engine, and a geartrain 11 mounted thereon. Geartrain 11 may include a crank gear 18, a cam gear 19 and an idler gear assembly 20. Crank gear 18 will typically be coupled with a crankshaft (not shown), in turn coupled with piston rods and rotatable thereby in a conventional manner. Cam gear 19 may be rotatably coupled with crank gear 18 via idler gear assembly 20 to maintain a desired timing therebetween. Idler gear assembly 20 includes a hub 26 defining an axis C and a gear ring 22.

Although engine system 10 is shown having a single idler gear assembly, in other embodiments multiple idler gears might be used depending upon the engine design. Hub 26 and gear ring 22 are biased toward coaxial alignment, such that an axis of gear ring 22 is coextensive with axis C. Gear ring 22 is translatable in a direction perpendicular to axis C responsive to a torque imparted thereto by at least one of crank gear 18 and cam gear 19.

Gear ring 22 may be translated across a distance D, to a position such that its axis of rotation is movable in a direction perpendicular to axis C to the position denoted as axis C'. Because translation of gear ring 22 relative to hub 26 across distance D may affect the relative timing between cam gear 19 and crank gear 18, the available translation distance may be selected based at least in part on an allowable departure from the desired timing. In other words, because gear ring 22 assists in synchronizing cam gear 19 and crank gear 18, translation of gear ring 22 will temporarily allow cam gear 19 and crank gear 18 to be slightly out of synch. Where allowable timing differences between cam gear 18 and crank gear 19 are relatively large, translation distance D may be relatively large. In contrast, where operating constraints require that the timing differences be relatively small, translation distance D should be selected to also be relatively small. As stated above, hub 26 and gear ring 22 are biased toward coaxial alignment, so when the torque inducing the translation of gear ring 22 subsides, gear ring 22 and hub 26 will return toward coaxial alignment, making up any differences in relative timing. By translating gear ring 22, loads on idler gear assembly 20, and the other idler gear assembly embodiments described herein, may be managed to reduce noise, wear, etc., and the adjacent meshing gears may be maintained in mesh during operation. In FIG. 1, arrow A represents a general translation direction of gear ring 22, whereas lines $L_1$ and $L_2$ are used to illustrate the relative positions of the axis of gear ring 22 in its rest or biased position, and translated position, respectively.

Figure 2:
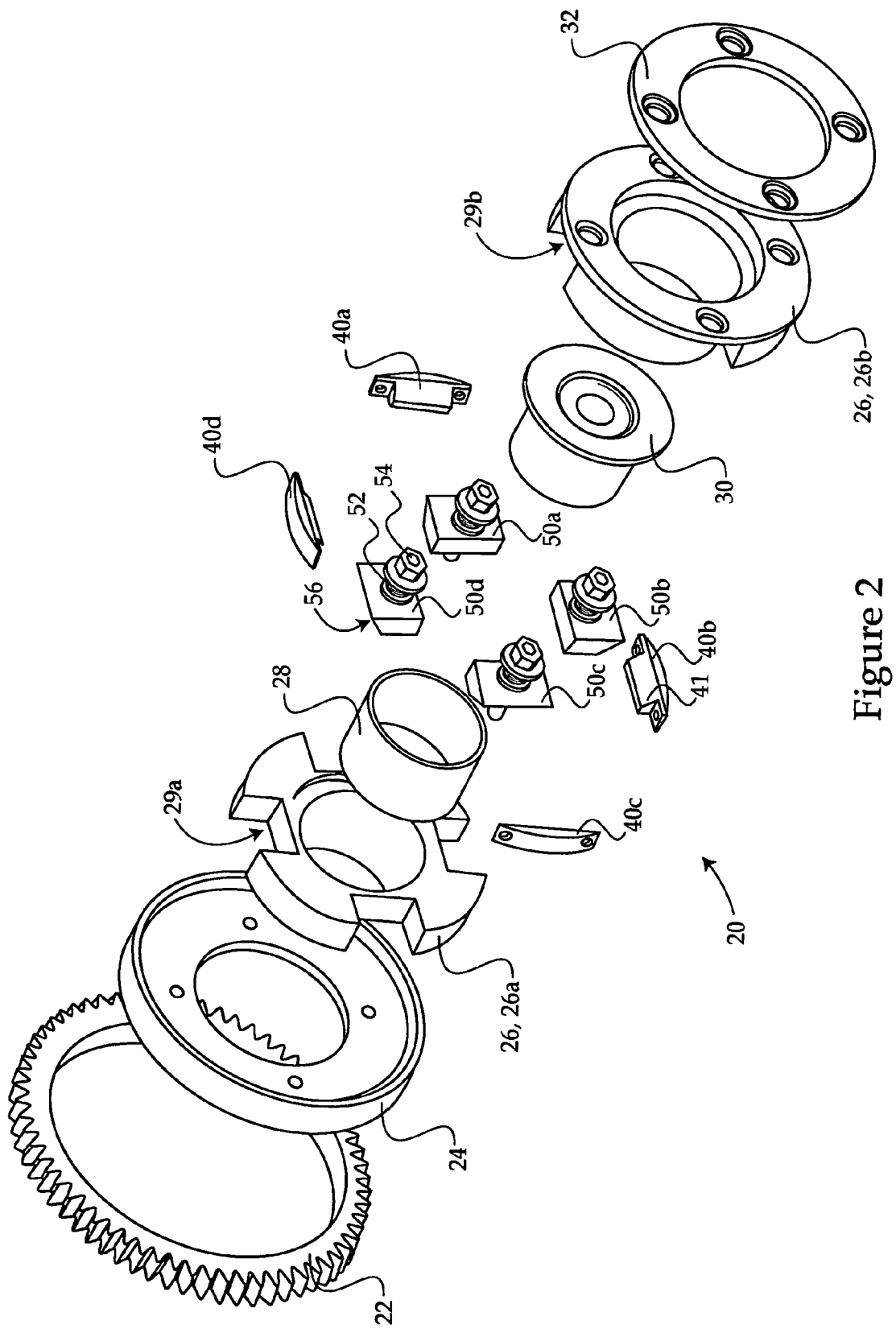
FIG. 2 is an exploded view of a compliant gear assembly according to the present disclosure.
Figure 3B:
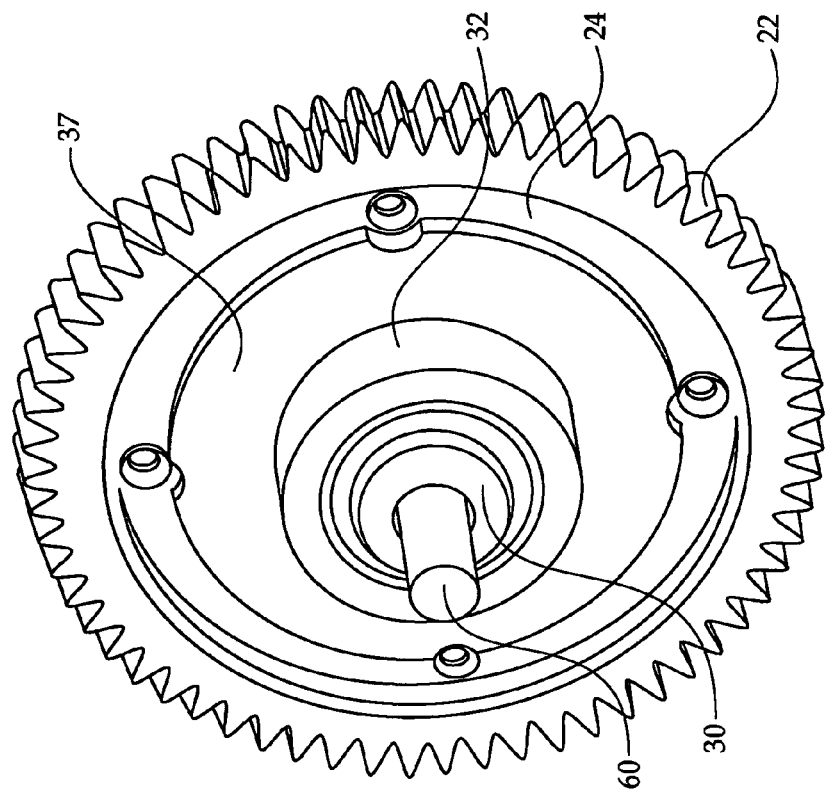
Figure 3A:
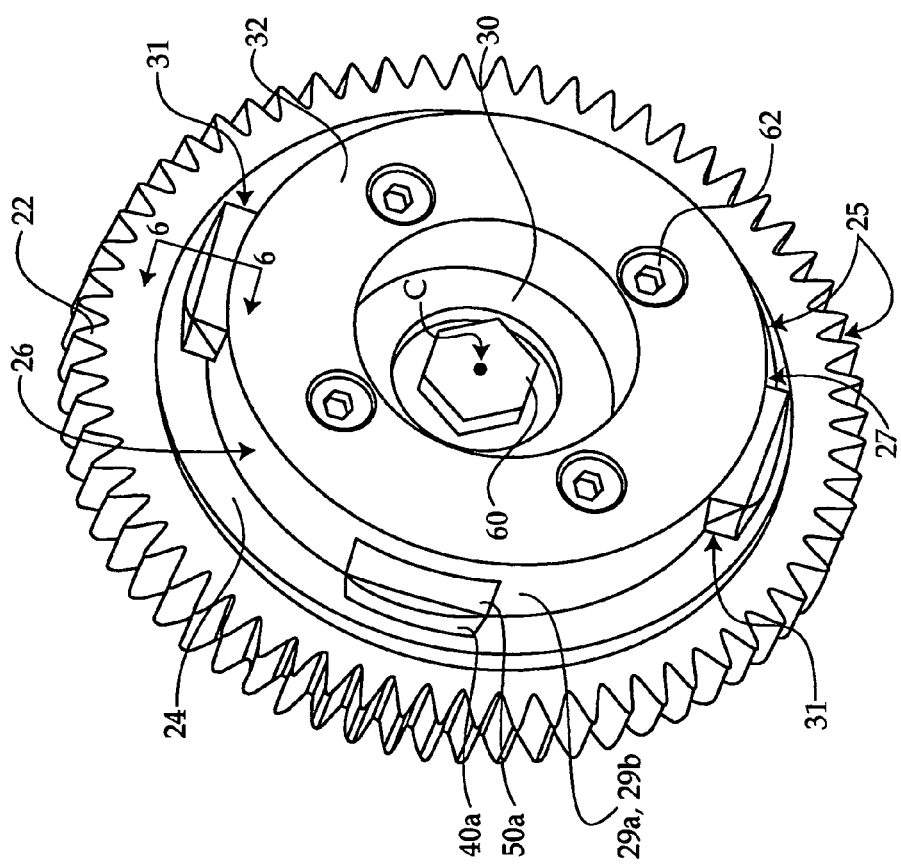
FIG. 3a is a front perspective view of a compliant gear assembly in accordance with the present disclosure.

Turning to FIGS. 2, 3a and 3b there are shown exploded and assembled front and back perspective views, respectively, of various components of one embodiment of an idler gear assembly 20 suitable for use in engine system 10 of FIG. 1. It should be appreciated that any of the idler gear assemblies described herein may be used with any of the described engine and geartrain configurations, as well as other systems not specifically illustrated. Idler gear assembly 20 includes a gear ring subassembly 25 having an outer toothed gear ring 22 and an annular inner portion 24. Gear ring subassembly 25 is adapted to be mounted about a hub 26, comprising a hub subassembly 27 having first and second hub portions 26a and 26b. In gear assembly 20, gear ring subassembly 25 and hub subassembly 27 are fixed to rotate together and biased toward coaxial alignment with at least one actuator 31, for example, a plurality of actuators including springs 52 and blocks 50a-d. As described herein, gear ring 22 is configured to translate relative to hub 26, however, it should be understood that part or all of the components of gear ring subassembly 25 might be translatable relative to part or all of the components of hub subassembly 27. Thus, the descriptions herein of gear ring 22 translating relative to hub 26 should not be construed to mean that only gear ring 22 is moved relative to only hub 26, as other components may be involved. The threshold requirement is that idler gear assembly 20 have some component that is capable of relative movement in a direction perpendicular to the axis defined by hub 26 responsive to a torque on gear assembly 20.

Hub subassembly 27 may be further mounted on a stubshaft 30 adapted to couple gear assembly 20 with engine 12 via a rotatable mounting shaft 60. A bushing 28 may further be positioned between stubshaft 30 and hub subassembly 27. The plurality of actuators may include a plurality of blocks 50a-d each coupled with a plurality of springs 52 and mounted upon a plurality of pins 54. When gear ring 22 is translated relative to hub 26, it will move against a biasing force of springs 52. Hence, when the torque on gear assembly 20 which induces the translation of gear ring 22 subsides, biasing springs 52 may urge gear ring 22 and hub 26 back toward coaxial alignment. Although in the illustrated embodiment of gear assembly 20, actuators 31 having springs and blocks 52 and 50a-d, are shown, it should be understood that the present disclosure is not thereby limited. It is only necessary that at least one actuator be provided which is capable of biasing hub 26 and gear ring 22 toward coaxial alignment. The term "actuator" as described herein should be understood to encompass a wide variety of devices, including spring, hydraulic, pneumatic, or combinations of spring, hydraulic and pneumatic actuators.

Each of the plurality of actuators 31 may be positionable within cutouts 29a and 29b of hub portions 26a and 26b, respectively. Ring subassembly 25 may in turn include at least one contact surface 41, for example, a plurality of contact surfaces disposed on a plurality of pads 40a-d aligned one with each of blocks 50a-d and radially spaced about ring subassembly 25. Translation loads on gear assembly 20 will typically be reacted via a bearing of pads 40a-d against blocks 50a-d. Because the entire assembly will typically rotate on mounting shaft 60, the particular blocks and pads which react a given translation load will vary, depending upon the relative angular position of gear assembly 20 when the translation inducing torque is encountered. A cover or ring plate 32 may also be provided and, in conjunction with a plurality of bolts 62 separate from pins 54, may couple together all of the assembled components of gear assembly 20 in the desired configuration. It should be appreciated that each of springs 52 may require a relatively high pre-load, on the order of 800 pounds per spring in some embodiments, and, hence, relatively robust means for coupling all of the components together may be desirable. Further, orienting springs 52 to compress and expand in a direction aligned with the axis of rotation of gear assembly 20 facilitates assembly as the springs may be compressed and the entire assembly secured with bolts 62 in a relatively small number of assembly steps.

Figure 6:
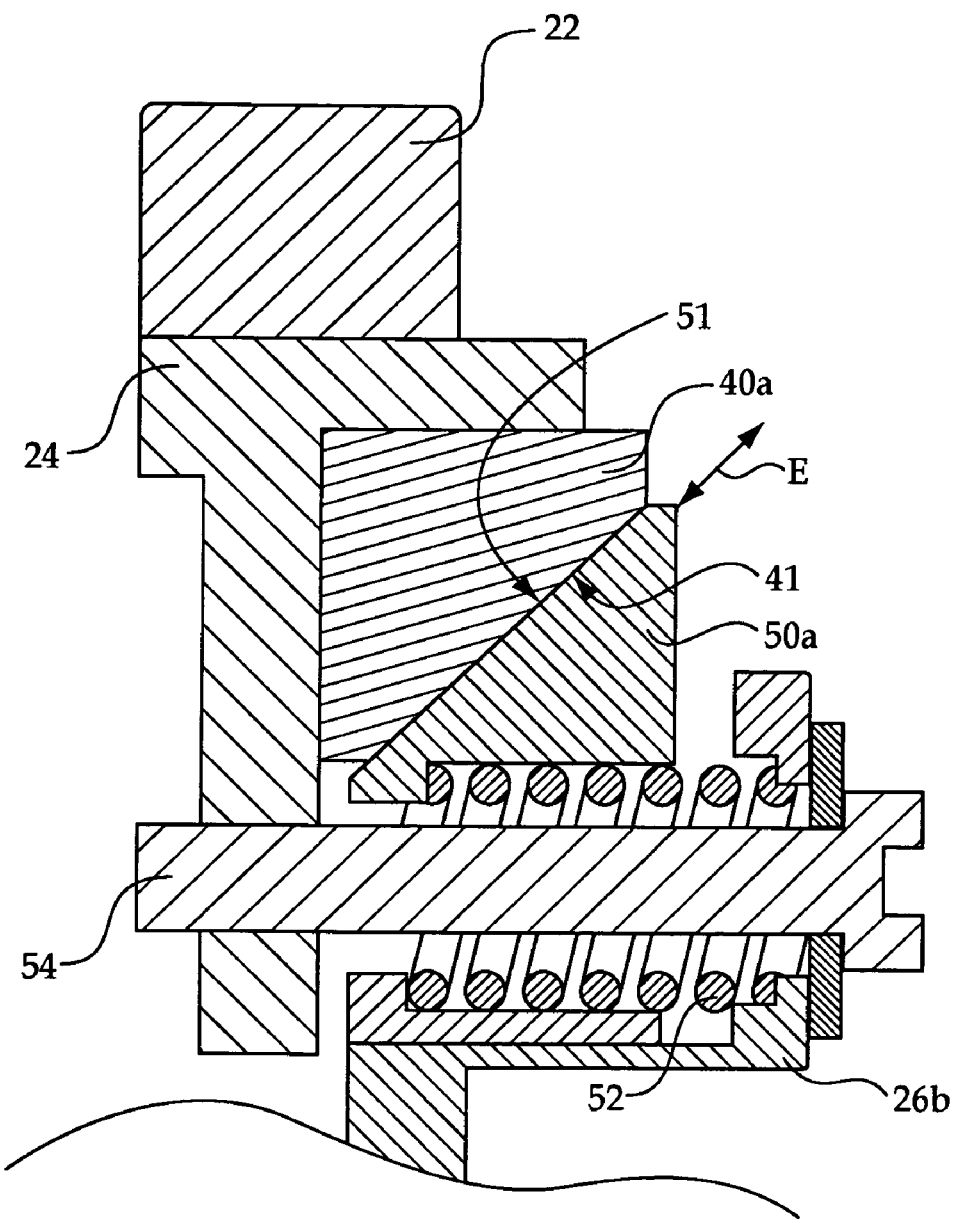

Turning to FIG. 6, there is shown a sectioned side taken along line 6-6 of FIG. 3. FIG. 6 illustrates gear ring 22, gear ring inner annular portion 24, a pad 40a, a block 50a, spring 52 and a pin 54. Block 50a is shown with pin 54 extending therethrough, however, in other embodiments block 50a will be configured without a corresponding pin. In such as embodiment, blocks 50a may be movable within and guided by cutouts 29a and 29b alone, or other components. Translation of gear ring 22 relative to hub portion 26b will typically include overcoming a static coefficient of friction between block 50a and pad 40a. A block surface 51 of block 50a may be positioned to slidably abut a contact surface 41 of pad 40a. A lubricant may be disposed between the respective surfaces 41 and 51. In the illustrated configuration, surfaces 51 and 41 are oriented diagonally relative to an axis of rotation of gear assembly 20. It should be appreciated that the relative orientation of the diagonal surfaces might differ from that illustrated, or even be reversed, without departing from the intended spirit and scope of the present disclosure. In addition to overcoming a static coefficient of friction between surfaces 41 and 51, in order to translate gear ring 22, and its associated subassembly 25, relative to hub subassembly 27 it may be necessary to overcome, a pre-load of springs 52. Thus, where it is desired to provide a relatively stiffer gear train, springs 52 might be relatively more highly preloaded, whereas for a relatively less stiff gear train, having greater compliance, springs 52 might be preloaded relatively less. An approximate direction of sliding movement between block 50a and pad 40a during translation of gear ring 22 is shown in FIG. 6 via arrow E. Those skilled in the art will appreciate that a wide variety of factors may contribute to the preload which is overcome when block 50a translates relative to pad 40a. Relative friction between the slidable surfaces, ramp inclination, spring preloading, etc. may all be varied to a preload level to be matched or exceeded by torque on the gear prior to translation. In some embodiments, spring preload will be determined solely by dimensions and tolerances of the various components.

Figure 4:
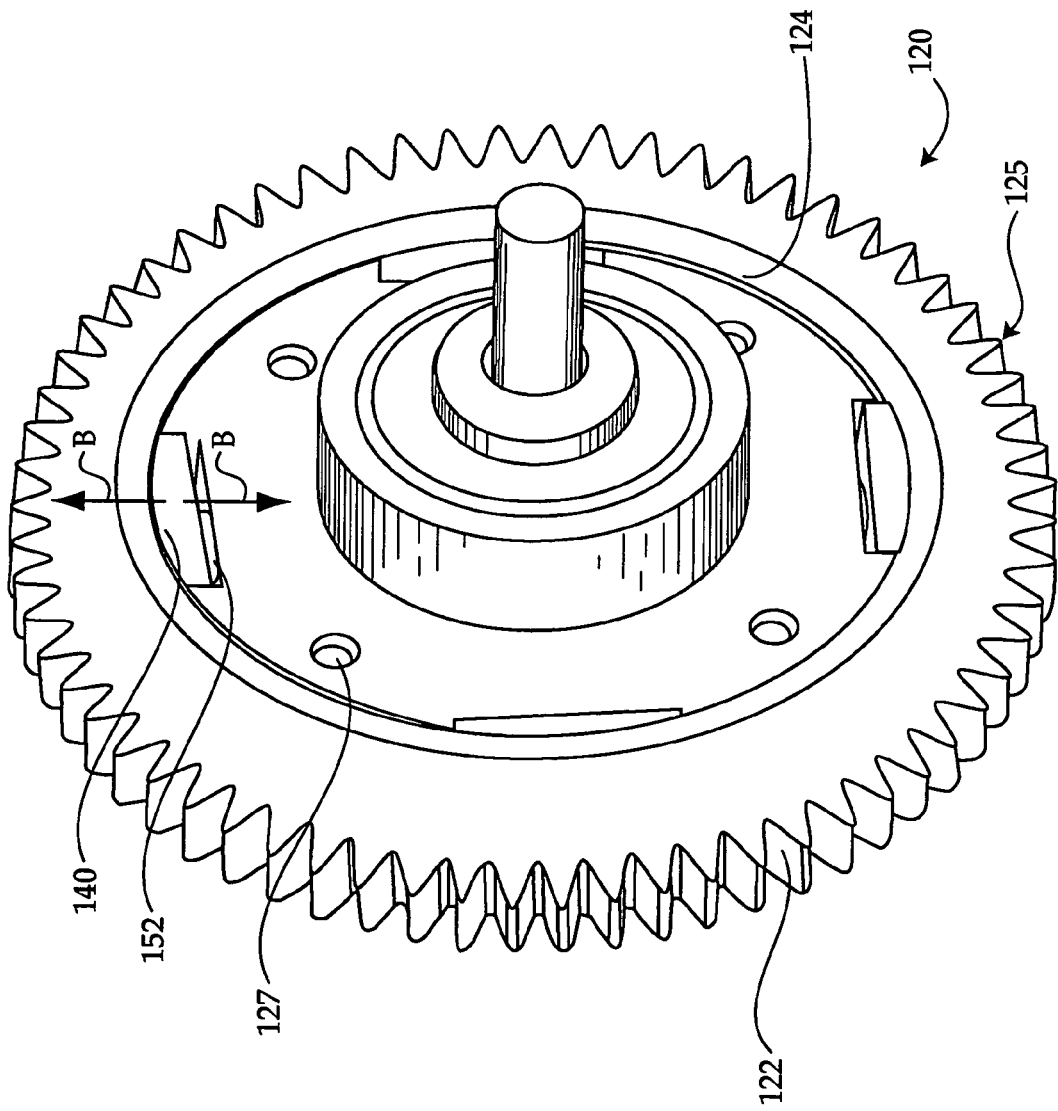
FIG. 4 is a perspective view of an alternative embodiment for a compliant gear assembly in accordance with the present disclosure.

Turning to FIG. 4, there is shown a gear assembly 120 according to another embodiment of the present disclosure. Gear assembly 120 has similarities to gear assembly 20, including a hub subassembly 127, and a gear ring subassembly 125 having a gear ring 122 and a gear ring inner annular portion 124. Similar to gear assembly 20, gear ring subassembly 125 is configured to translate relative to hub subassembly 125 responsive to a torque on gear assembly 120. A plurality of actuators each including a block 140 and spring 152 may be disposed between hub subassembly 127 and gear ring subassembly 125. In contrast to gear assembly 20, blocks 140 do not slide relative to any portion of gear ring subassembly 125, rather, springs 152 move in a direction denoted by arrow B that is approximately perpendicular to an axis of rotation of gear assembly 120.

Figure 5:
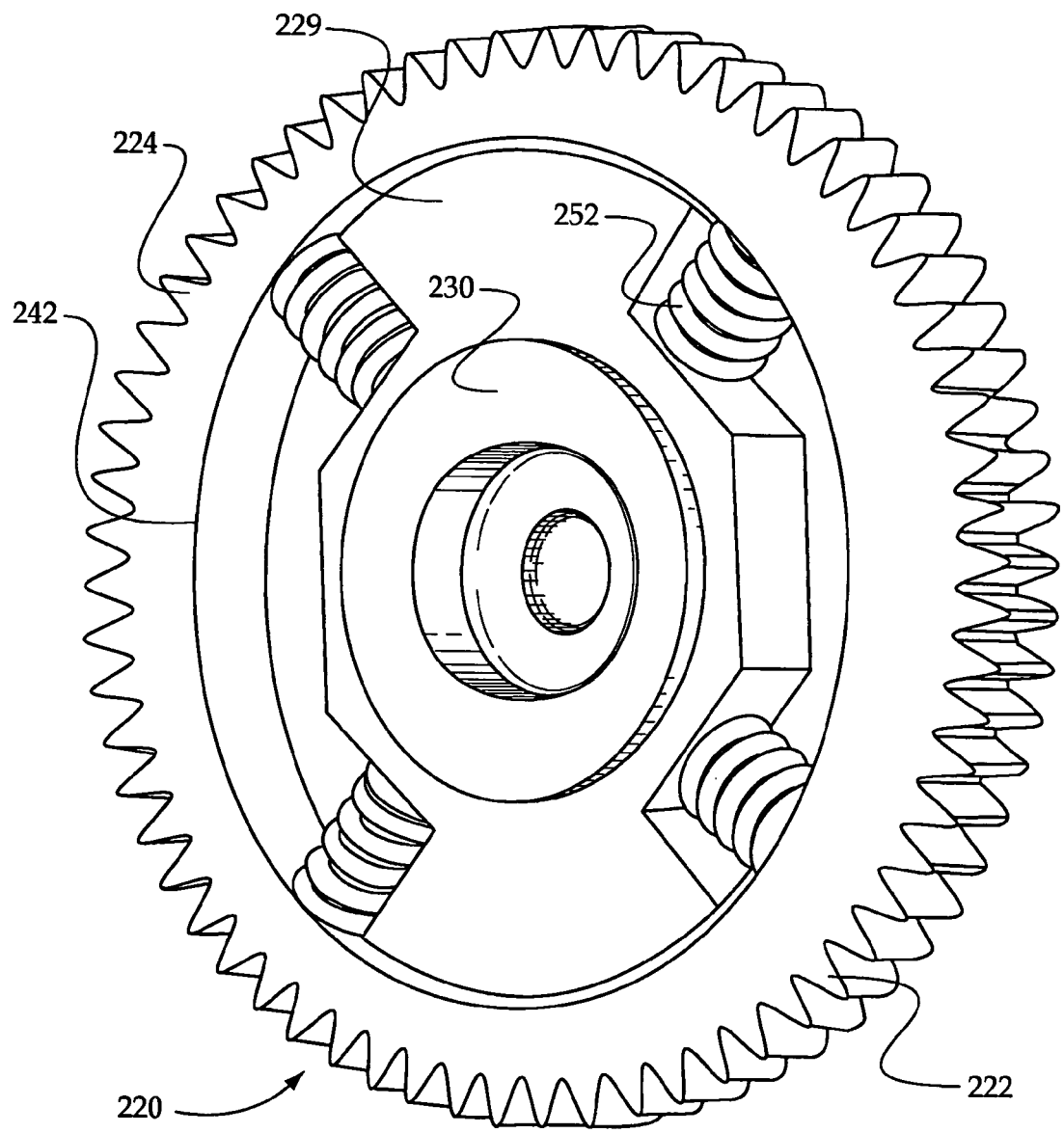
FIG. 5 is a perspective view of yet another embodiment of a compliant gear assembly according to the present disclosure.

Referring now to FIG. 5, there is shown yet another embodiment of a gear assembly 220 according to the present disclosure. Gear assembly 220 is similar to the foregoing embodiments, in that an outer gear ring 224 is translatable relative to a hub 229 responsive to a torque on gear assembly 220. However, rather than blocks, the embodiment of FIG. 5 uses springs 252 which are oriented radially outwardly about hub subassembly 229 and abut a contact surface 242 of gear ring 224.

Figure 7:
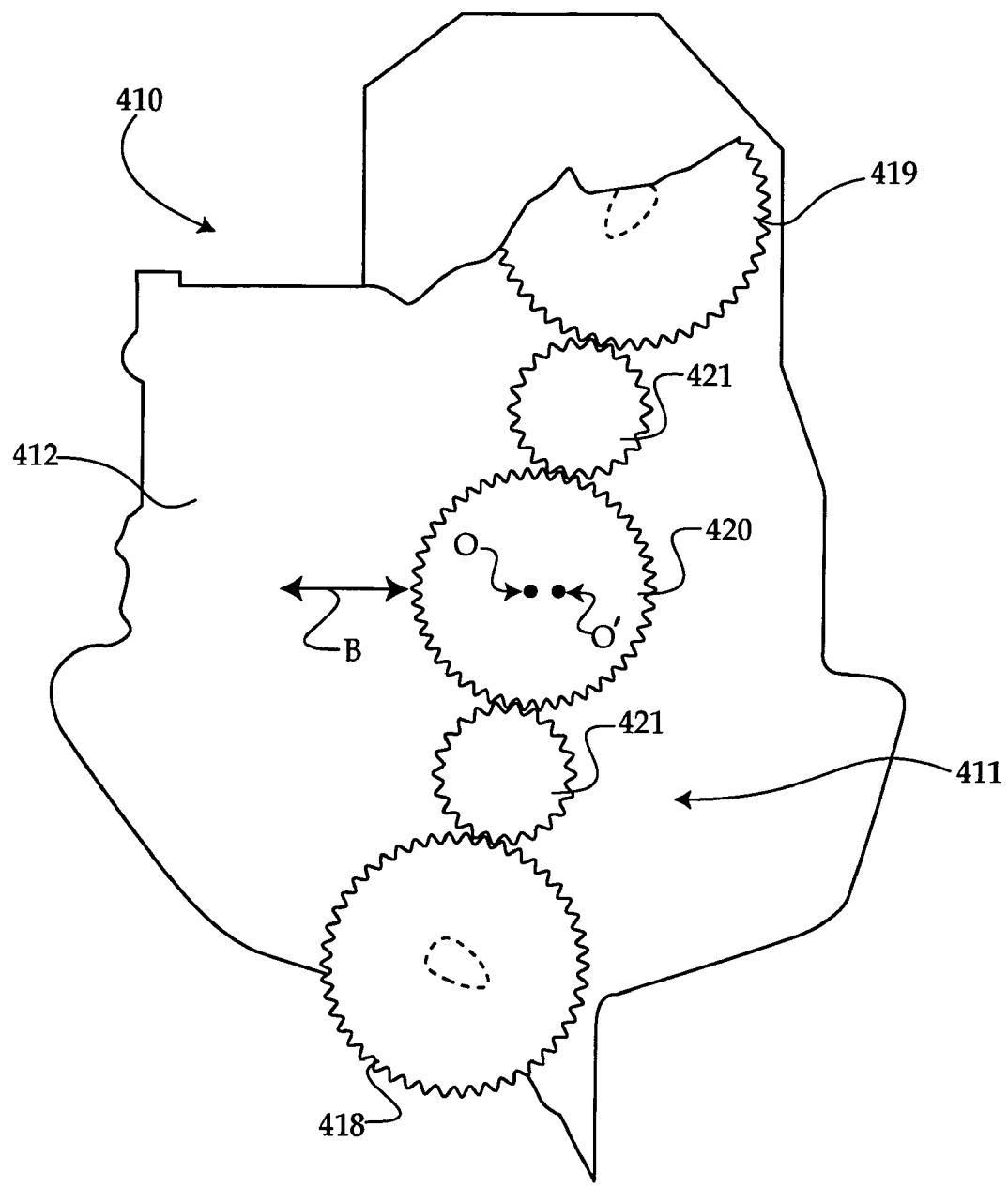
FIG. 7 is a schematic illustration of an engine system according to another embodiment of the present disclosure.

Referring to FIG. 7, there is shown an engine system 410 differing from engine system 10 in that a geartrain of the engine 411 is relatively closer to an in-line configuration, and includes additional intermediate gears 421. Similar to engine system 10 of FIG. 1, geartrain 411 includes a cam gear 419 and a crank gear 418, and an idler gear assembly 420 having a gear ring (not shown in FIG. 7) which is translatable responsive to a torque on the gear assembly such that the axis of rotation of the gear ring will also translate in directions shown with arrow B. Also illustrated are the two relative positions of the axis of rotation of the gear ring, O and O', similar to the different axial positions for the gear ring of gear assembly 20 shown in FIG. 1. Idler gear assembly 420 also differs from the foregoing embodiments, among other things, in that rather than a gear ring fixed to rotate with a hub, the gear ring is rotatable about the hub, which is in turn fixed to engine 412.

Figure 8:
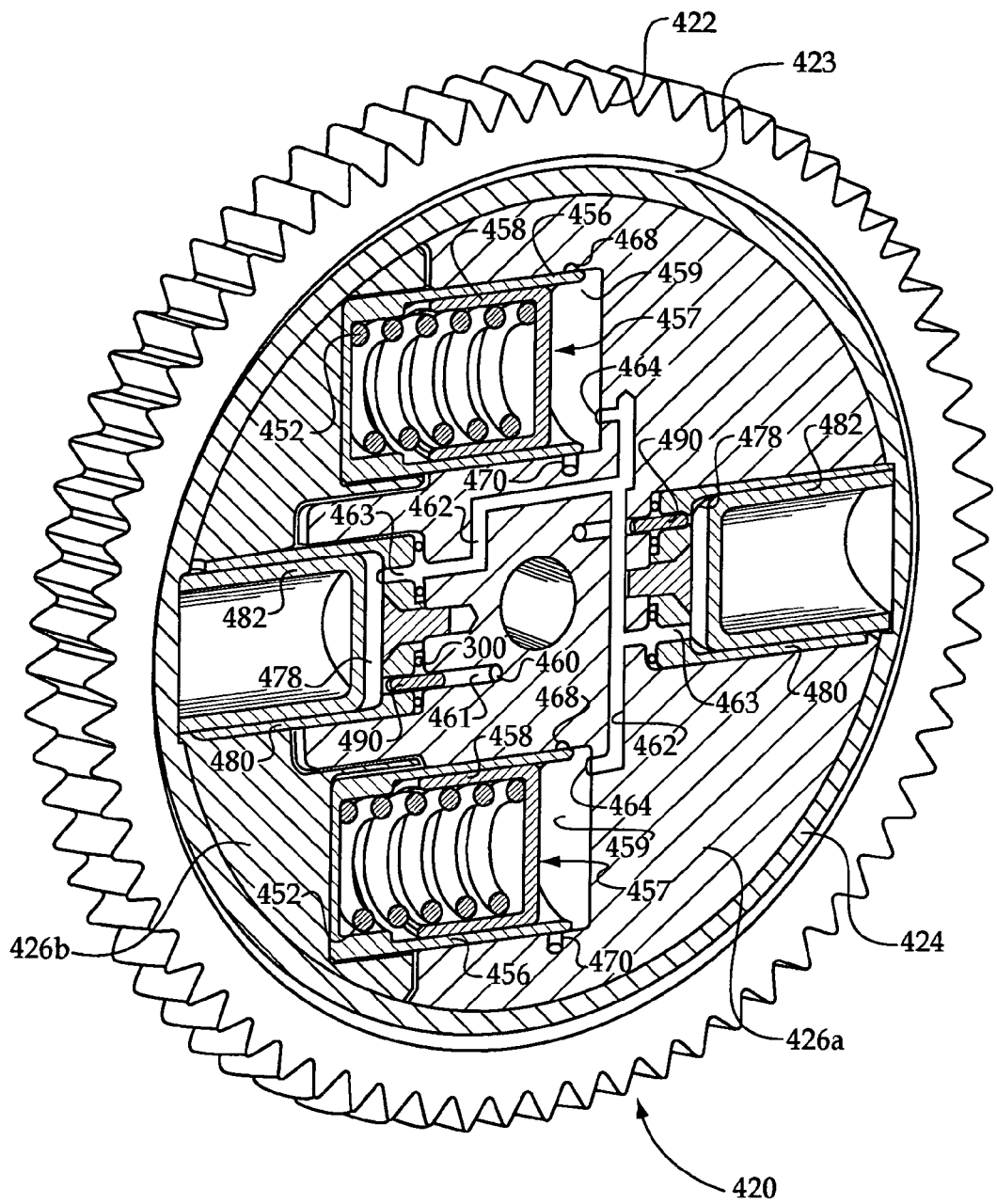
FIG. 8 is a sectioned side view, in perspective, of an idler gear assembly according to yet another embodiment of the present disclosure.

Turning now to FIG. 8, there is shown a sectioned side perspective view of idler gear assembly 420. Idler gear assembly 420 includes a gear ring 422, mounted on a ring bearing 423 about a mounting ring 424. A first hub portion 426a is also provided, and will typically be configured to fixedly mount to engine 412. A second hub portion 426b may be fixed to mounting ring 424 and configured to move relative to first hub portion 426a. First and second hub portions 426a and 426b may be configured to mate, and movable between an abutting position and a separated position at which gear ring 422 is coaxially aligned with first hub portion 426a, as described herein. When gear assembly 420 experiences a torque impulse, second hub portion 426b, gear ring 422, ring bearing 423 and mounting ring 424 may all move as a unit relative to first hub portion 426a. In other embodiments, the functions of the respective hub portions might be reversed. Further still, gear assembly 420 might include a different number of hub portions than two.

Gear assembly 420 is further provided with at least one actuator configured to bias gear ring 422 toward coaxial alignment with first hub portion 426a. The at least one actuator may comprise two hydraulically actuated compensation pistons 458. Compensation pistons 458 may be positioned at least partially within first hub portion 426a, and may further each include a pressure surface 457 exposed to a fluid pressure of first and second fluid cavities 459 defined by first hub portion 426a. Compensation pistons 458 may further be movable each within a sleeve 456 that is fixed to second hub portion 426b, for example, pressed therein. A spring 452 may be disposed internally, or via another configuration, between each of pressure compensation pistons 458 and sleeves 456. For reasons that will be apparent from the following description, springs 452 may have a relatively soft spring rate or spring constant and, in cooperation with hydraulic pressure of cavities 459, will allow gear ring 422 to translate responsive to torques on gear assembly 420, but may dynamically isolate gear assembly 420 from certain impulsive frequencies of geartrain 411 which are considered most problematic during operation of engine 412.

Hydraulic fluid may be supplied to gear assembly 420 from a hydraulic system of engine system 410, for example, directly from the block of engine 412. To this end, first hub portion 426a may include at least one, for example two, fluid inlets 460 connecting each with a fluid supply passage 461 within hub portion 426a. Passages 461 may in turn connect via inlet check valves 490, for example reed valves, with fluid pressurization chambers 478. Chambers 478 may be defined, for example, by a second set of sleeves 480 fixed, for example pressed, to hub portion 426a. At least one, for example two, fluid pressurization pistons 482 may be movably disposed within sleeves 480 and coupled to move with mounting ring 424. Thus, translation of mounting ring 424 with gear ring 422 will induce pistons 482 to move back and forth within their respective sleeves as gear ring 422 and its associated components translate, as described herein. Movement of pistons 482 will alternately draw fluid into chambers 478 via valves 490, and push fluid out via a fluid outlet 463 connecting to each of chambers 478. Fluid outlets 463 may connect via a fluid pressure passage 462 with each of cavities 459, allowing fluid pressurized by pistons 482 to be supplied thereto. Check valves such as reed valves may also be associated with outlets 463. Each of cavities 459 further includes a fluid outlet 468, for example an annulus in first hub portion 426a, which connects to a fluid drain 470. Outlets 468 may be alternately opened and closed by sleeves 456 based on the fluid pressure in cavities 459, as described herein, and loads on gear assembly 420.

INDUSTRIAL APPLICABILITY

Returning to the embodiment of FIGS. 2, 3a-b and 6, during normal geartrain operation, gear assembly 20 will rotate to transmit torque from crank gear 18 to cam gear 19, maintaining desired engine timing such that fuel injection and, for example, valve opening and closing, can take place at desired times. During continued operation, one or both of crank gear 18 and cam gear 19 will experience impulsive torque loads, which are transmitted to gear assembly 20. Preloading of springs 52 will typically keep geartrain 11 relatively stiff, only allowing compliance via translation of gear ring 22 when gear assembly 20 is subjected to a torque load above a predetermined magnitude. When a sufficient torque, either independently from one of crank gear 18 and cam gear 19, or simultaneously from both, is applied to gear assembly 20, gear ring 22 may begin to move out of coaxial alignment with hub 26. Referring in particular to FIG. 6, translation of gear ring 22 will take place by a pad 40a sliding against a block 50a in the manner described herein. As pad 40a and block 50a slide relative to one another, spring 52 will be compressed. It should be appreciated that pad and block pairs disposed opposite one another in gear assembly 20 will slide in opposite relative directions. Translation of gear ring 22 will cease when either the torque impulse ceases, spring 52 reaches a state where it may not be further compressed, or where some mechanical limit such as a stop (not shown) causes gear ring 22 to cease its translation movement away from coaxial alignment with hub 26. In any event, when a torque of sufficient magnitude is no longer applied to gear ring 22, it will begin to return toward coaxial alignment with hub 26 via expansion of one or more of springs 52. Although by no means limited, translation distance of gear ring 22 relative to hub 26 may be relatively small, for example, about 0.60 millimeters. This relatively small translation distance may in some instances correspond to about 0.52 degrees of crank angle in engine system 10.

Gear assembly 20, described in particular with regard to FIGS. 2, 3a, 3b and 6 offers a relatively compact assembly capable of relatively easy manufacture, assembly, and packaging. Moreover, the symmetrical arrangement of the spring and block actuators about the assembly, and the interaction between diagonal surfaces on the pads and blocks provides a design that is translatable responsive to torques on the gear assembly without tipping out of its intended plane of alignment with other gears of the geartrain. Moreover, while it is contemplated that the direction of translation will primarily be that illustrated with arrow A in FIG. 1, gear ring 22 may translate in any direction.

It should further be appreciated that the particular arrangement and number of components of gear assembly 20 might be varied significantly without departing from the intended spirit and scope of the present disclosure. For instance, rather than the hub and gear ring being rotatable together, embodiments are contemplated wherein a center hub is fixed relative to the engine housing, and a gear ring assembly rotates about the center hub, biased toward coaxial alignment with at least one actuator between the hub and gear ring. Moreover, a one-piece hub rather than a two piece hub might be used, and various additional components such as an idler thrust plate might be added. Similarly, rather than separate pads bolted or otherwise affixed to the gear ring inner annular portion, in turn attached to the outer toothed gear ring, a one-piece component might be used. In still further designs (not shown), rather than blocks and springs aligned with the axis of rotation of the gear assembly, springs alone might be used, oriented slightly outwardly from the gear assembly axis of rotation and abutting a surface(s) of the gear ring or gear ring subassembly that is oriented diagonally relative to the gear assembly axis of rotation. Such a design could operate in a manner analogous to that of gear assembly 20, but use relatively fewer components.

The embodiments shown in FIGS. 4 and 5 will function in a manner similar to that of gear assembly 20, with several exceptions. In gear assembly 120 of FIG. 4 and gear assembly 220 of FIG. 5, for example, springs 152 and 252 will compress without sliding interaction between components as the respective gear rings translate under the influence of a torque, then expand to return the components toward coaxial alignment.

Operation of the embodiment of FIG. 8 differs from that of the aforementioned embodiments in a number of ways, although it shares certain operating principles. During operation, gear ring 422 will rotate about hub portions 426a and 426b upon bearing 423. Gear ring 422 will be biased toward coaxial alignment with first hub portion 426a, but will translate from coaxial alignment therewith when a torque of sufficient magnitude is applied to gear ring 422. Pre-loading of springs 452 via hydraulic force may provide a relatively high threshold for translational displacement, corresponding to a relatively strong load on gear assembly 420. When gear ring 422 translates, it will in turn urge bearing 423, mounting ring 424 and second hub portion 426b to move therewith. Movement of second hub portion 426b against the bias of springs 452 will cause the leftmost fluid pressurization piston 482, as shown in FIG. 8, to pressurize fluid in chamber 478 and supply the same to cavities 459, increasing or maintaining fluid pressure therein and, hence, a hydraulic force applied via pressure surfaces 457 to pre-load springs 452. Simultaneously, the rightmost fluid pressurization piston 482 in FIG. 8 may draw fluid into cavity 478 via valve 490. When gear ring 422 returns toward a coaxially aligned position with first hub portion 426a due to the biasing force of springs 452, the operation of fluid pressurization pistons 482 may reverse. In this manner, translation of gear ring 422 can maintain fluid pressure in cavities 459, in turn providing an appropriate biasing force to bias gear ring 422 toward its desired position. As fluid pressure in cavities 459 increases, hub portions 426a and 426b will tend to be urged toward a fully separated position. Increasing fluid pressure in cavities 459 will thus tend to move sleeves 456 to positions at which annuli 468 are uncovered, and fluid can flow to drains 470. In this manner, the pre-load on springs 452 from fluid pressure in cavities 459 may be maintained within a desired range, and restored in cases where it has dropped.

Gear assembly 420 may be configured to translate relatively rapidly due to certain loads on one side, but will transfer the load less rapidly, or less impulsively, to a gear meshing on the opposite side due to its rotation and the translation of gear assembly 420 induced by the loading. Thus, gear assembly 420 will allow crank gear 419 and/or cam gear 418 to go through their respective dynamic oscillations with significantly reduced force interaction with one another through the geartrain than in conventional designs. A relatively powerful torque shock from one of gears 418 or 419 will be attenuated as it is transferred to the other of gears 418 and 419, allowing the inertias of the gears 418 and/or 419 to accommodate the loading without significant backlash or other undesirable responses. This allows the crankshaft and camshaft to undergo dynamic oscillations generally independently of one another.

Gear assembly 420 may have a natural frequency, i.e. of one hub portion translating relative to another, that will effectively track the frequencies imparted by gears 418 and 419. However, due to the relatively soft spring rate of springs 452, springs 452 can accommodate relatively rapid displacements without the components of gear assembly 420 moving substantially under short-lived changes in support force from springs 452. In other words, given their spring rate, springs 452 can accommodate strong, impulsive loads without requiring that other components of gear assembly 420 move significantly. This allows a relatively small amount of translation between hub portions 426a and 426b to accommodate relatively large loads.

The role of gear assembly 420 may thus be as a relatively light and responsive idler gear which can accommodate the motions and impulses of the other gears, but without transmitting problematic impulses through geartrain 411. As a result, the steady state or "normal" load transferred across gear assembly 420 may be the load required to transfer sufficient energy from crank gear 418 to cam gear 419 to keep the speed of cam gear 419 at a desired speed.

Further, applying pre-load to springs 452 via pistons 458 provides for sufficient spring force to bias gear assembly 420 as desired, and limits translation between hub portions 426a 426b under loads where translation is not desired. The pre-load of springs 452 may result in a torque pre-load for gear assembly 420 of about 150 Newton-meters, for example, although in other engine and geartrain systems this value may differ. The combination of a relatively soft spring rate for springs 452 with sufficient reaction force provided by their pre-loading allows a more regular torque to be passed through geartrain 411, via shaving of the peaks off of high, impulsive torques from the associated cam and crank shafts. Moreover, the hydraulic pressure necessary to provide sufficient spring force via force on pistons 458 from cavities 459 is provided by the pumping action of pistons 482. In this manner, gear assembly 420 is self-compensating, utilizing translational motion of gear ring 22, transmitted to pistons 482, to provide a biasing force that is capable of returning gear ring 422 toward its desired coaxial position following its translation responsive to impulsive loads.

Gear assembly 420 will thus typically be configured to translate relatively freely responsive to dynamic loading frequencies, providing compliance in geartrain 411 when needed, but the hydraulics will allow canceling out of displacements at frequencies associated with a mean load, allowing those loads to be transmitted through gear assembly 420. In other words, desired torques may be readily transmitted through gear assembly 420, whereas undesired torques are less easily transmitted. The design of gear assembly 420 is further contemplated to be implemented within existing packaging constraints, and the use of hydraulic force to pre-load springs 452 obviates the need for positioning very highly compressed springs within the assembly. In other embodiments, however, the hydraulic compensation means might be dispensed with and some other type of pre-loading used for springs 452.

The present disclosure thus provides various designs for gear assemblies configured to use translational motion to attenuate impulsive loads. This contrasts with conventional strategies which use rotational compliance directed to similar goals. The present disclosure is further distinct from earlier designs seeking to address dynamic behavior close to the sources of excitation, i.e. the cam gear and crank gear in the context of an engine geartrain. Many conventional geartrains tend to be quite stiff to begin with and, hence, the relatively modest amount of gear translation in the direction of mesh forces between the gears can significantly reduce the peak force levels at the gear teeth by attenuating the transfer of energy between and among the gears. In systems designed and operated according to the present disclosure, gear rattle, noise and the associated wear and tear on geartrains is reduced. Peak torques and overall dynamic activity in gear train may also be substantially reduced, and gear teeth can be better maintained in mesh with one another. In some embodiments existing gear trains may be retrofitted with the compliant gear assemblies of the present disclosure. In others, a gear train or engine may be originally designed and built in accordance with the present disclosure.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while the present description is largely focused on the use of the described compliant gear assemblies in the context of an engine geartrain, the present disclosure is not thereby limited. Any gear system wherein some compliance between meshing gears is desirable may benefit from the teachings of the present disclosure. Still further, while maintaining timing between a crank gear and cam gear tends to be relatively important in the context of an internal combustion engine, and hence, compliant gear assemblies are considered to be particularly applicable to engines having roughly in-line geartrains, the present description should not be considered to limit application of the teachings herein to an in-line gear system. In other technical areas, where gear to gear timing is of relatively less importance, but some level of compliance still desirable, the present disclosure may be applicable. Other aspects, features and advantages will be apparent upon an examination of the attached drawings and appended claims.

What is claimed is:

1. A gear assembly comprising:
a hub adapted for mounting the gear assembly to a housing, the hub including a front side and a back side and defining a first axis which extends through the front side and the back side of the hub;
a gear ring positioned about said hub and defining a second axis which includes an axis of rotation of the gear ring, said gear ring being configured to translate in a direction of translation perpendicular to said first axis responsive to a torque on said gear assembly, wherein the gear ring is movable a translation distance in the direction of translation between a first position where the gear ring is coaxial with the hub and a second position where the gear ring is not coaxial with the hub;
at least one actuator coupled between said hub and said gear ring and configured to bias said gear ring toward coaxial alignment with said hub;
wherein the at least one actuator includes a spring defining a longitudinal spring axis oriented perpendicular to the first axis and the second axis, the spring having a first axial spring length at the first position of the gear ring and a second axial spring length at the second position of the gear ring which is less than the first axial spring length, and wherein a difference between the first axial spring length and the second axial spring length is equal to the translation distance of the gear ring; and
wherein said string includes a first spring defining a first longitudinal spring axis, the at least one actuator further including a second spring defining a second longitudinal spring axis, and wherein the first longitudinal spring axis and the second longitudinal spring axis are oriented parallel to one another and are not co-linear.

2. The gear assembly of claim 1 wherein said hub is a first hub portion and said gear ring is configured to rotate about said first hub portion, said gear assembly further comprising a hub subassembly that includes said first hub portion and a second hub portion configured to translate with said gear ring relative to said first hub portion.

3. The gear assembly of claim 2 wherein said first hub portion defines said first axis, said first hub portion including a first outer surface extending between the front side and the back side of the hub and said second hub portion including a second outer surface extending between the front side and the back side of the hub, said first and second hub portions being configured to mate with one another, wherein the second hub portion is movable with the gear ring between the first position and the second position, and wherein at the second position the first outer surface abuts the second outer surface and at the second position the first outer surface does not abut the second outer surface.

4. The gear assembly of claim 3 wherein the first spring and the second spring of said at least one actuator are coupled with a first hydraulically actuated compensation piston and a second hydraulically actuated compensation piston, respectively, the first hydraulically actuated compensation piston applying a hydraulic preloading force to the first spring and the second hydraulically actuated compensation piston applying a hydraulic preloading force to the second spring.

5. The gear assembly of claim 4 wherein said first hub portion defines at least one fluid cavity, wherein each said hydraulically actuated compensation pistons includes a pressure surface exposed to a fluid pressure of said at least one fluid cavity.

6. The gear assembly of claim 5 further comprising at least one fluid pressurization piston configured to translate with said gear ring and operable to supply a pressurized hydraulic fluid to said at least one fluid cavity.

7. A gear assembly of comprising:
a hub defining a first axis;
a gear ring positioned about said hub and defining a second axis, said gear ring being configured to translate in a direction perpendicular to said first axis responsive to a torque on said gear assembly; and
at least one actuator coupled between said hub and said gear ring and configured to bias said gear ring toward coaxial alignment with said hub;
wherein said at least one actuator comprises a biasing spring;
wherein said hub is a first hub portion and said gear ring is configured to rotate about said first hub portion, said gear assembly further comprising a hub subassembly that includes said first hub portion and a second hub portion configured to translate with said gear ring relative to said first hub portion;
wherein said first hub portion defines said first axis, said first and second hub portions being configured to mate with one another and movable between a first, abutting, position and a second, separated, position, and wherein said at least one actuator is configured to bias said first and second hub portions toward said second position at which said gear ring is coaxially aligned with said first hub portion;
wherein the biasing spring of said at least one actuator is coupled with a hydraulically actuated compensation piston;
wherein said first hub portion defines at least one fluid cavity, wherein said hydraulically actuated compensation piston includes a pressure surface exposed to a fluid pressure of said at least one fluid cavity;
the gear assembly further comprising at least one fluid pressurization piston configured to translate with said gear ring and operable to supply a pressurized hydraulic fluid to said at least one fluid cavity;
wherein said first hub portion includes first and second fluid pressurization chambers disposed at opposite positions about said first axis;
wherein said at least one fluid pressurization piston comprises a first and a second fluid pressurization piston disposed at least partially within said first and second fluid pressurization chambers, respectively;

wherein said at least one fluid cavity includes a first and a second fluid cavity each having a fluid inlet connecting with each of said fluid pressurization chambers, and a fluid outlet; and wherein said at least one actuator comprises first and second actuators each comprising a movable sleeve positioned about one of said hydraulically actuated compensation pistons and movable relative to said first hub portion to selectively block or open said fluid outlet.

* * * * *